Aug. 15, 1961  O. H. LINDQUIST  2,995,929
AIRCRAFT INDICATORS
Filed Dec. 17, 1956  2 Sheets-Sheet 1
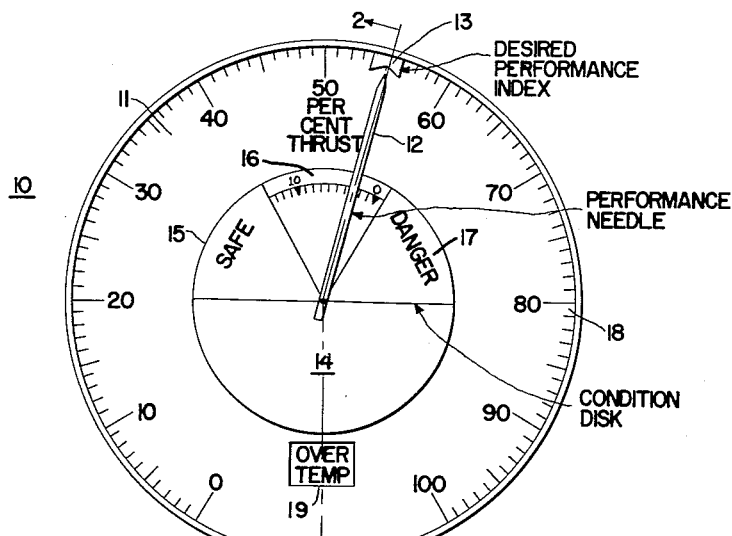
Fig. 1
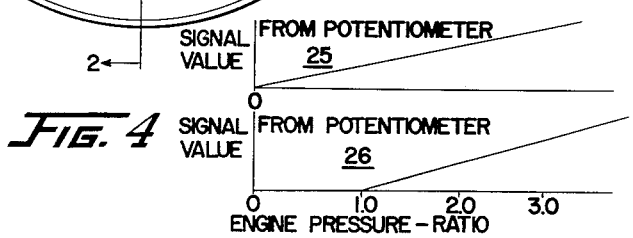
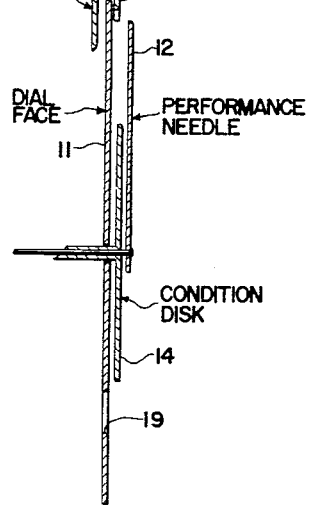
Fig. 2
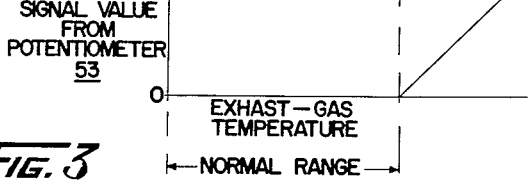
Fig. 3
INVENTOR.
OIVA H. LINDQUIST
BY Roger W. Jensen
ATTORNEY Aug. 15, 1961     O. H. LINDQUIST     2,995,929
AIRCRAFT INDICATORS
Filed Dec. 17, 1956     2 Sheets-Sheet 2

INVENTOR.
OIVA H. LINDQUIST
BY Roger W. Jensen
ATTORNEY

United States Patent Office 2,995,929
Patented Aug. 15, 1961

2,995,929
AIRCRAFT INDICATORS
Oiva H. Lindquist, Richfield, Minn., assignor to Minneapolis-Honeywell Regulator Company, Minneapolis, Minn., a corporation of Delaware
Filed Dec. 17, 1956, Ser. No. 628,648
6 Claims. (Cl. 73—116)

This invention relates to the field of aviation instruments and more particularly to an integrated engine performance indicator.

The nature and complexity of present day flight confronts the pilot with flight limitations due to air frame structure, engine, fuel supply, altitude, and other difficulties. Generally, the pilot must read and interpret numerous indicators which reflect the conditions previously mentioned. The instrument presentations are so numerous that the pilot experiences difficulty in performing the task of monitoring the various instruments. Since one of the most important parts of any aircraft is the aircraft engine, a great deal of the pilot's time is expended monitoring the instruments pertaining only to the aircraft engine.

Regrouping of the indicators which represent conditions of the aircraft engine has aided the pilot by providing a standardized instrument panel, but the number of instruments generally has not decreased. In aircraft of the type which employ flight engineers or additional flight personnel to monitor the various instruments, the problem is not as critical as it becomes in a jet-engine powered aircraft piloted by a single crew member who is required to perform all necessary functions in the aircraft. Changing the instrument shapes and sizes has also increased the efficiency of the flight personnel: the number of instruments however still remains about the same.

One method of correcting this requirement of scanning a multitude of aircraft engine instruments, is to provide an integrated engine performance indicator in the form of a single instrument which gives the pilot a fast, accurate picture of what his engine is doing and what it will be doing. An integrated engine performance indicator will tell the pilot how to cruise at the best economy and indicates when the condition of the engine deviates from its normal operation. The integrated engine performance indicator relieves the pilot of reading several instruments, relating these readings, and remembering numerical limits and engineering information pertaining to the aircraft engine. Thus, one instrument can provide the pilot with the necessary information for efficient operation of the aircraft engine and enable him to use his own judgement to select a course of action with respect to his flight plan, and the indicated engine condition, with the knowledge of the margin of safety existing in his engine operation. Experience has also indicated that an integrated engine performance indicator requires much less time to be read than the conventional instruments while providing an instrument which the pilot will interpret much more accurately.

The present invention combines several instruments into one in such a manner that when the engine is performing efficiently the condition may be interpreted at a glance from the engine performance indicator. To be more specific, one area of novelty in the present engine performance indicator comprises slaving an engine condition disc to an engine performance needle as long as the engine is performing within a safe condition but allowing the condition disc to move with respect to the performance needle and thereby give the pilot an indication of what performance he may expect from his engine and what it may be doing a certain time from when the reading was taken.

It is a general object of the present invention to provide an improvement in aircraft indicators, particularly in the field of integrated engine performance indicators.

Another object of the present invention is to provide an instrument having one movable element slaved to another for a safe condition, and having the same generally slaved element move with respect to the other element for an unsafe condition.

Still another object of the present invention is to provide, in an integrated instrument, an index which will indicate the scheduled performance expected of the engine.

A further object of this invention is to provide an instrument which indicates engine performance and damage condition in one instrument.

Another object of this invention is to show when the input conditions of an aircraft engine, such as speed and/or exhaust gas temperature, depart from their normal operating condition.

Still another object of the present invention is to reduce the time required by the pilot for scanning and interpreting numerous instruments.

These and other features of the invention will be understood more clearly and fully from the following detailed description and accompanying drawings in which:

FIGURE 1 is a front view of the face portion of the engine performance indicator;

FIGURE 2 is a sectioned view of FIGURE 1 showing relative placement of the movable elements;

FIGURE 3 is a graph showing the relative signal values of certain components representing operating ranges of jet engine speed and exhaust-gas temperature;

FIGURE 4 is a graph showing the relative signal values of certain components representing operating ranges of jet engine pressure-ratio.

Figure 5:
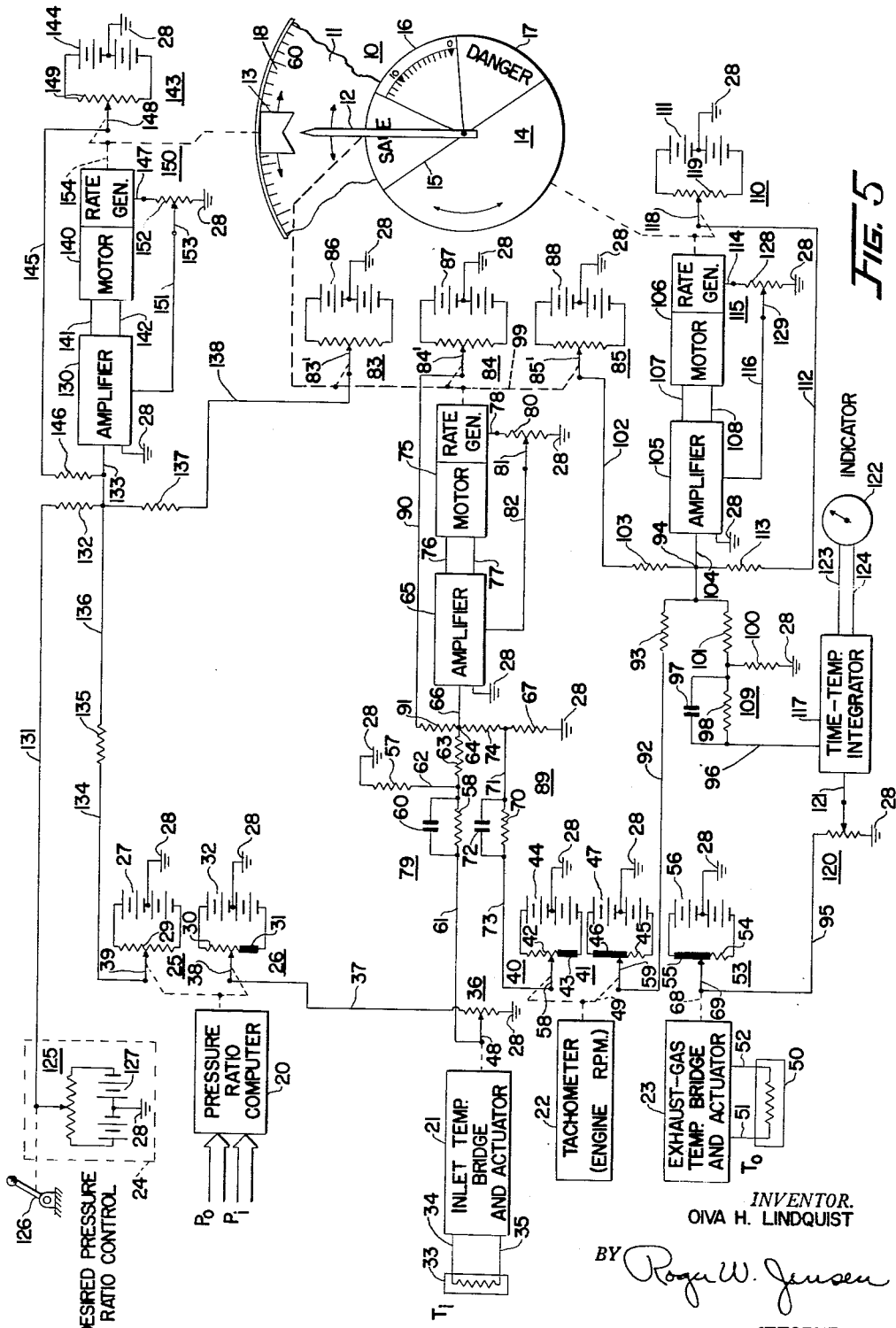
FIGURE 5 is a schematic diagram showing a typical design that may be employed in an integrated engine performance indicator.

Referring to FIGURE 1, the face of an integrated engine performance indicator is shown comprising a dial face 11, a moveable element 12 which will be generally referred to as a performance needle, an index 13 which will most commonly be referred to as a desired performance index, a rotatable disc 14 which will be generally referred to as a condition disc, and an aperture 19 which may contain one, or a series of displays indicating a condition which is not normal to aircraft engine operation. Condition disc 14 has a circular shape which is divided into sections indicating a safe condition, a warning condition, and a danger condition. These sections could be conveniently colored such as green for the safe condition section 15, amber or yellow for the warning condition section 16, and red for the danger condition section 17. Furthermore, warning section 16 of condition disc 14 is graduated to show the operator the approximate length of the interval during which the engine may be safely operated under prevailing conditions outside of the normal range of conditions. This normal range of conditions will be more fully described in a subsequent part of the specification. As shown, performance needle 12 is superimposed upon condition disc 14, which is superimposed upon dial face 11, as is desired performance index 13. Members 12, 13 and 14 are moveable elements and rotate concentrically about the center of the instrument. Dial face 11 has a scale 18 which is subdivided into equal portions to show percent of thrust of the aircraft engine.

FIGURE 2 shows the relative placement of the various elements including performance needle 12, desired performance index 13, condition disc 14, dial face 11, and aperture 19. It may be noted that the various elements are free to move without interference with respect to each other.

Referring now to FIGURE 5, there are shown a pressure-ratio computer 20, an inlet-temperature bridge and actuator 21, a tachometer 22, an exhaust gas temperature bridge and actuator 23, and a desired pressure-ratio control 24. Pressure-ratio computer 20 may be of the type disclosed in the Robert J. Kutzler copending application 432,249 filed on May 25, 1954: the two inputs shown are engine output pressure $P_o$ and engine input pressure $P_i$. A pair of potentiometers 25 and 26 are operated by pressure-ratio computer 20. Potentiometer 25 has a resistive element 29 and a movable contact arm 39. A voltage source 27 is connected in parallel with the resistive portion 29 of potentiometer 25 and the voltage source is center tapped to ground 28. Potentiometer 26 has a movable contact arm 38, a resistive portion 30 and a metalized portion 31. Resistive portion 30 and metalized portion 31 are connected in series and if a resistance measurement is made between the moveable contact arm and the end of resistive portion 30 remote from the metalized portion, a value of resistance is obtained which increases linearly with the rotation of the moveable contact arm until the moveable contact arm engages the metalized portion: thereafter any further rotation produces no change in the resistance value. A voltage source 32 is connected in parallel with the series combination of resistive portion 30 and metalized portion 31, and voltage source 32 is center tapped to ground 28. Moveable contact arms 38 and 39 of potentiometers 26 and 25 respectively are connected mechanically to the pressure ratio computer 20 by a common shaft so that the contact arms are rotated by computer 20 to positions representative of the engine pressure ratio. Inlet-temperature bridge and actuator 21 is made up of a suitably energized electric bridge having a temperature sensor 33 connected in one leg of the bridge by leads 34 and 35 to vary the condition of balance of the bridge with changes in inlet temperature. The bridge unbalance signal is used to energize an amplifier and motor-generator combination to rebalance the bridge. Movable contact arm 48 of potentiometer 36 is connected to the motor-generator combination, and accordingly is driven to a position which is representative of the inlet-temperature. The resistive portion of potentiometer 36 is connected at one end to ground 28 and at the other end to the moveable contact arm 38 of potentiometer 26 by a connecting lead 37.

Engine tachometer 22 is connected to the aircraft engine and produces a mechanical signal representative of the engine speed and is connected through a shaft 49 to the movable contact arms 58 and 59 of potentiometers 40 and 41 respectively. Potentiometer 40 has a resistive portion 42 and a metalized portion 43 such as were previously described. The two portions 42 and 43 are connected in series and the combination is connected in parallel with a voltage source 44 which is center tapped to ground 28. Potentiometer 41 also has a resistive portion 45 and a metalized portion 46 which are connected in series and a voltage source 47 is connected in parallel with this series combination, the voltage source being center tapped to ground 28. The arrangement is such that when arm 58 is on metalized portion 43, arm 59 is on resistive portion 45. Exhaust-gas temperature bridge and actuator 23 is made up of a suitably energized electrical bridge having a temperature sensor connected in one leg thereof by a pair of connecting leads 51 and 52 to vary the condition of balance of the bridge with changes in exhaust-gas temperature $T_o$. The bridge unbalance signal is used to cause movement of the moveable contact arm 69 of a potentiometer 53, which also comprises a resistive portion 54 and a metalized portion 55, portions 54 and 55 being connected in series and the series combination being connected in parallel with a voltage source 56 which is center tapped to ground 28.

A signal representative of the engine pressure-ratio is produced by potentiometer 26 in response to operation of computer 20, and is supplied on a connecting lead 37 to potentiometer 36, where the signal is modified in accordance with the inlet-temperature $T_i$; the modified signal is supplied to a rate insertion network 79, made up of a resistor 57, a resistor 58, and a capacitor 60, by a connecting lead 61. Capacitor 60 and resistor 58 are connected in parallel, one end of the combination being connected to lead 61, and the opposite end of the combination being connected to resistor 57 by a connecting lead 62. Resistor 57 has its opposite end connected to ground 28. The junction point of resistor 58 and connecting lead 62, is connected by a resistor 63 to a junction point 64. Junction point 64 is then connected to an amplifier 65 by a connection lead 66. Another rate insertion network 89 is made up of resistors 67 and 70, and a capacitor 72. One end of resistor 67 is connected to ground 28 and the other end is connected by a connecting lead 71 to one end of a resistor 70; the other end of resistor 70 is connected to movable contact arm 58 by a connecting lead 73. Capacitor 72 is connected in parallel with resistor 70. A resistor 74 is connected between junction point 64 and the junction point between lead 71 and resistor 67. Thus amplifier 65, through the networks above described, receives a first signal which is a function of engine pressure-ratio as modified by engine inlet-temperature, and a second signal which is a function of engine speed.

Amplifier 65 is connected to a motor-generator combination 75 by a pair of connecting leads 76 and 77, and receives a negative feedback or anti-hunt rate signal from the rate generator as a third input. The generator output is supplied to the resistive portion of a potentiometer 80 through a connecting lead 78, the opposite end of the resistive portion of potentiometer 80 being connected to ground 28, and the moveable contact arm 81 of potentiometer 80 is connected to amplifier 65 by a connecting lead 82.

Energization of motor-generator combination 75 results in rotation of the output shaft 99 thereof which is connected by suitable means to performance needle 12 and to the moveable contact arms 83', 84', and 85' of three potentiometers 83, 84, and 85 respectively. Potentiometers 83, 84, and 85 have resistive portions which are respectively connected in parallel with voltage sources 86, 87 and 88, and the voltage sources are each center tapped to ground 28 by suitable connecting leads. As the motor-generator combination rotates, a balance voltage is developed on the moveable contact arm 84' of potentiometer 84 which is representative of the conditions presented to amplifier 65 and this voltage is applied to amplifier 65 as a fourth input by a connecting lead 90 and a resistor 91 which are connected between the moveable contact arm 84' of potentiometer 84 and junction point 64.

Contact arm 59 of potentiometer 41 connected through a current limiting resistor 93 to a junction point 94. A lead 96 connects a time-temperature integrator 117 to a rate insertion network 109. Time-temperature indicator 117 is energized through a connecting lead 121 from the contact arm of a potentiometer 120, one end of the resistive portion of which is connected to ground 28, while the other end is connected through a lead 95 to contact arm 69 of potentiometer 53. Network 109 comprises a resistor 98 and a capacitor 97 connected in parallel, and the parallel combination thereof is connected to ground 28 through another resistor 100. A resistor 101 is connected from the junction point between resistors 98 and 100 to junction point 94. Contact arm 85' of potentiometer 85 is connected through a resistor 103 to junction point 94 which is connected to an amplifier 105 by a connecting lead 104. Amplifier 105 is connected to motor-generator combination 106 by a pair of connecting leads 107 and 108. As the shaft of motor-generator combination 106 rotates, it rotates condition disc 14 and also a movable contact arm 118 of the potentiometer 110 having a resistive portion 119 energized from a voltage source 111, voltage source 111 being center tapped to ground 28. A balance signal proportional to the received input conditions is sent to amplifier 105 from moveable contact arm 118 of potentiometer 110 to junction point 94 by a connecting lead 112 and a resistor 113. Also, a rate feedback signal is obtained from a rate generator of motor-generator combination 106 and is supplied to the resistive portion 128 of a potentiometer 115 through a connecting lead 114, the opposite end of resistive portion 128 being connected to ground 28. The feedback circuit is completed from the moveable contact arm 129 of potentiometer 115 to amplifier 105 by a connecting lead 116.

To provide a further indication of the exhaust-gas temperature beyond the normal range, a time temperature integrator 117 is provided which is connected to the moveable contact arm of a potentiometer 120 which has its resistive portion connected between ground 28 and junction point 95′.

The desired pressure-ratio control 24, contains a potentiometer 125 having a movable contact arm rotated by a control arm 126, which may be connected to the engine throttle. Potentiometer 125 has a resistive portion connected in parallel with a voltage source 127, the voltage source being center tapped to ground 28. The contact arm is connected to the input lead 133 of an amplifier 130 by lead 131 and a resistor 132. Moveable contact arm 39 of potentiometer 25 is connected to lead 133 by a connecting lead 134, a resistor 135, and a connecting lead 136. A resistor 137 has one end connected to connecting lead 133, and the other end is connected to moveable contact arm 83′ by a connecting lead 138. Amplifier 130 is connected to a motor-generator combination 140 by a pair of connecting leads 141 and 142 allowing motor generator combination 140 to drive the moveable contact arm 148 of a potentiometer 143 to a position representative of the sum of the signals applied to amplifier 130. Potentiometer 143 has a resistive portion 149 which is connected in parallel with a voltage source 144, the voltage source being center tapped to ground 28. A balance signal voltage is obtained from moveable contact arm 148 of potentiometer 143 and returned to amplifier input connecting lead 133 through a connecting lead 145 and a current limiting resistor 146. To provide a negative feed-back rate signal to amplifier 130, motor-generator combination 140 supplies a rate signal to a resistive portion 152 of a potentiometer 150 by a connecting lead 147, the opposite end of resistive portion 152 being connected to ground 28. The moveable contact arm 153 of potentiometer 150 is connected to amplifier 130 by a connecting lead 151 to provide the negative feedback rate signal. The shaft 154 of motor-generator 140 is used to position both the moveable contact arm 148 of potentiometer 143 and the desired performance index 13.

Several potentiometers such as potentiometers 26, 40, 41, and 53 have been described as having a resistive portion and a metalized portion. These potentiometers are of the characterized type and generally include a resistance element which is connected to a strip of resistance material which is metalized to produce signals such as the signals shown in FIGURES 3 and 4. Two of the signals shown in FIGURE 3 represent the signals as obtained from potentiometers 41 and 53 whereby a constant signal is developed for a normal range of operation which could be any predetermined range, and an increasing signal is developed which is representative of conditions outside the normal range. In other words, potentiometers 41 and 53 provide signals which remain constant through a first range of conditions and increase linearly through a second range of conditions, the second range of conditions being outside of the normal range of operating conditions. Potentiometer 40 produces a signal as shown in FIGURE 3 whereby the signal increases linearly with engine speed during the normal range of operations and give a constant signal in a second range of conditions beyond the normal range.

FIGURE 4 also shows the type of signal values that may be obtained from potentiometers 25 and 26 which produce signals representative of engine pressure-ratio, potentiometer 26 producing a constant signal until the pressure-ratio reaches a value of one, and potentiometer 25 producing an increasing signal for all values of pressure ratio.

*Operation*

The operation of the indicator will first be described in the normal operating range. There are a plurality of input conditions which affect the integrated engine performance indicator. These include conditions sensed by pressure ratio computer 20, inlet temperature sensor 33, engine tachometer 22, and exhaust gas temperature sensor 50, as well as the setting of desired pressure ratio control 126. Each of the condition responsive devices has its signal producing means, namely potentiometers 25, 26, 36, 40, 41, 53, and 125.

Proceeding now with a signal from pressure-ratio computer 20 in the form of its output shaft rotation, a signal is developed at potentiometer 26 which is used to energize potentiometer 36. The signal is modified by the inlet-temperature actuator output and the modified signal is supplied to amplifier 65 through connecting lead 61, rate insertion network 79, current limiting resistor 63, and amplifier input lead 66. Current limiting or isolation resistors such as 63, 91, and 74, are used to prevent the energizing means or voltage sources from having short circuits placed across their terminals, and may be referred to as summing resistors which are used in a parallel summing technique applying signals to an amplifier. Rate insertion network 79 is used to produce a rate signal which is combined with the steady state signal from potentiometer 40 to appear at junction point 64. A signal representative of the engine speed is supplied to rate network 89, and this network supplies a signal representative of engine speed and rate of change thereof to junction point 64 through resistor 74. Thus at junction point 64, signals representative of engine speed, engine inlet-temperature and engine pressure ratio, and their rates of change, are combined, and the combination is supplied to amplifier 65 by connecting lead 66, causing operation of motor generator combination 75. Motor-generator combinations 140, 75, and 106 may be of any of the common types used to produce a shaft rotation in a direction which is determined by the sense of the signal supplied thereto. This shaft rotation is used to rotate movable arms 83′ and 85′ as well as performance needle 12. For closed loop operation a balance signal of opposite sense to the amplifier input signal is returned from potentiometer 84 to amplifier 65 by connecting lead 90 and current limiting resistor 91: when the balance signal becomes equal to the input signal the amplifier input is zero and shaft rotation ceases. Thus, motor-generator combination 75 positions performance needle 12 to a value representative of pressure ratio, inlet temperature and engine speed. A feedback network to prevent hunting or oscillations is also provided in the form of potentiometer 80 and connecting leads 78 and 82 which return a negative feedback rate signal to the amplifier. Since available thrust is a function of pressure ratio, engine speed, and inlet temperature, performance needle 12 is therefore positioned with respect to the dial face 11, to indicate the available thrust in the jet engine: scale 18 is decimally graduated so that the indicator is directly readable in terms of thrust as a percentage of a predetermined maximum.

Turning now to exhaust gas temperature bridge and actuator 23, the exhaust gas temperature is sensed by sensor 50 and any unbalance produced in the bridge causes the actuator to adjust a bridge balancing means and to simultaneously rotate the movable contact arm 69 of potentiometer 53. For normal conditions of engine operation potentiometers 53 and 41 produce constant signals which are of zero value. Therefore, the only signal to junction point 94 obtained from an outside source other than the circuitry associated with amplifier 105 and motor-generator 106 is the signal obtained from potentiometer 85 which is representative of engine performance or thrust. This signal is used to energize amplifier 105 and thereby cause motor generator combination 106 to operate. A balance voltage is developed on potentiometer 110 and this voltage is returned to amplifier junction point 94 by connecting lead 112 and resistor 113. Since motor generator combination 106, which rotates movable contact arm 118 of potentiometer 110 also rotates condition disc 14, and since the input signal is representative of engine performance, the disc 14 is slaved to the performance needle 12 and gives a normal indication of a safe condition as shown in FIGURE 5 by the needle 12 being superimposed on the safe section 15 of condition disc 14. By having the condition disc 14 so slaved to performance needle 12, the aircraft crew member derives a benefit from having fewer instruments to read and probably more important, which increases his efficiency by simplifying the task of monitoring the engine performance. Another decided advantage is that by combining the instruments and slaving the condition disc to the performance needle, the aircraft pilot or crew member has less difficulty in adjusting to a single instrument showing all of the engine conditions; it is necessary for him to make a concentrated effort in adjusting the engine controls only when the condition disc is not slaved to the performance needle, as will now be described.

Assume that the engine is so operating that one or both of movable contact arms 59 and 69, which are driven in accordance with engine speed and exhaust gas temperature respectively, produce signals representative of values outside the normal range of operation. In other words, tachometer 22 may indicate engine speed beyond the normal range, or bridge and actuator 23 may indicate exhaust-gas temperature beyond the normal range. If the engine speed is beyond the normal range, the output of potentiometer 41 is no longer zero, and a signal which increases with engine speed is sent to amplifier 105. Similarly if the exhaust gas temperature is beyond the normal range, the output of potentiometer 53 is no longer zero, and a signal representative of the exhaust gas temperature beyond the normal range is sent to amplifier 105. Therefore, amplifier 105 receives one, and possibly two, signals in addition to the signal received from potentiometer 85 which is representative of the engine performance: this causes motor-generator combination 106 to drive movable contact arm 118 of potentiometer 110 to a new position in which the voltage from potentiometer 110 is sufficient to balance the input voltages or signals. Condition disc 14 is thus rotated to a new position with respect to performance needle 12. Thus, it may be seen that if the engine speed increases or varies beyond its normal range or if the exhaust gas temperature varies beyond its normal range, condition disc 14 is no longer simply slaved to performance needle 12, but moves with respect thereto so that the needle appears to move across the warning sector and finally into the danger sector. The excess of the exhaust gas-temperature over its normal range is integrated with respect to time to give the pilot an indication of how much longer his engine may be successfully operated under the abnormal conditions before damage to the engine may be expected to occur. The length of such an interval may be indicated by marking suitable divisions on warning section 16 of condition disc 14.

The performance needle responds whenever the throttle is moved, and the crew member quickly learns the association between the two: whenever he sees the performance needle superimposed on the danger area he knows that he should reduce his throttle setting. Engine damage is not, however, associated with any particular performance needle setting on scale 18.

An over temperature condition is likely at relatively low speeds when the engine is not developing thrust. Also, if the engine is operating at a particular power setting which brings the engine nearer to the engine damage conditions, the addition of after burning can be tolerated for a short period of time only. For these reasons, the engine damage warning is servoed or slaved to the performance needle.

Excessively high exhaust-gas temperature for more than brief intervals can permanently damage an aircraft engine, and an indicator 122 has been provided which separately indicates the values of exhaust-gas temperature which are above a normal operating range and these are integrated by the time temperature integrator before being presented to indicator 122. One method of accomplishing this integration is to provide amplifying means driven by a signal from potentiometer 120 which increases with the exhaust gas temperature, and to operate thereby a relay or motor which changes the value shown on indicator 122. Indicator 122 may be driven by a clock or time base device, and thereby present an integrated indication of the condition existing on potentiometer 120 in the form of a permanent record on a tape or chart. This serves to give the maintenance personnel a flight history of the jet aircraft engine and to provide more efficient maintenance.

In usual operation of jet engines it is customary to maintain flight at a predetermined pressure ratio and a predetermined Mach number. To accomplish this at various altitudes and conditions of loading requires different values of thrust. Index 13 is provided for the purpose of assisting the crew member to maintain the desired pressure ratio regardless of the thust involved. To accomplish this index 13 is slaved to needle 12, with overriding control by the difference between the actual and desired pressure ratios: thereupon any difference between the positions of needle 12 and index 13 indicates that the actual thrust is not that required to maintain the desired pressure ratio, and the crew member may take suitable action to increase or decrease available thrust accordingly.

The detailed operation of this portion of the invention is as follows: As control arm 126 is advanced, the desired pressure-ratio control 24 produces a signal which is supplied to amplifier 130 by connecting lead 131 and resistor 132. A signal representative of actual engine pressure-ratio is obtained from potentiometer 25 and is supplied to amplifier 130 by connecting lead 134, resistor 135, and leads 136, and 133. A signal representative of engine performance is obtained from potentiometer 83 and sent to amplifier 130 by connecting lead 138, 133 and resistor 137. Amplifier 130 then has signals representative of a desired pressure-ratio, an actual pressure-ratio, and engine performance; and this combined signal is used to cause motor generator 140 to rotate and position the movable contact arm of potentiometer 143 and engine desired performance index 13. A signal representative of the desired performance index position is obtained from potentiometer 143 and is sent to amplifier 130 as a balance signal through connecting lead 145, resistor 146, and connecting lead 133. Therefore, the desired performance index is driven to a position representative of engine performance, modified in accordance with any deviation or difference between the desired pressure-ratio and the actual pressure-ratio, and may be compared with the performance needle. With this information then, the crew member knows that he must move the throttle until the performance needle is at the same position as the desired performance index.

The control means, made up of an amplifier and motor-generator combination, may be of any common type in current use as well as the energizing means which are shown as batteries in the present invention. Further, amplifiers 130, 65, and 105 are grounded externally so as to present the input signals with a ground reference. Also, the voltage sources have been shown center tapped to ground, but they may be tapped at a point other than at the mid point for several of the circuits shown. The aperture 19 shown in dial face 11 may contain lamps or other means of immediate identification to the pilot that a danger condition exists in the engine.

While I have shown and described a specific embodiment of this invention, the invention should not be limited to the particular form shown, and I intend in the appended claims to cover all modifications which do not depart from the spirit and scope of the invention.

What I claim is:

1. In apparatus for indicating a plurality of conditions: first indicating means including a first rotatable index member; a graduated scale positioned adjacent to said first member; second indicating means including a second rotatable graduated member coaxially aligned with said first element and adapted to rotate relative to said first member; first control means normally causing said index member to rotate relative to said scale in response to a change of a first condition; second control means causing said graduated member to rotate in response to said change of first condition so that said second member is normally slaved to said first member; and third control means for modifying the operation of said second control means as a time function of a further condition to thereby cause relative movement between said rotatable index member and said rotatable graduated member in response to a change of a second condition.

2. In apparatus for indicating a plurality of conditions: first condition responsive means including signal producing means for producing signals representative of a first condition; second condition responsive means including signal producing means for producing a signal representative of a second condition; third condition responsive means including signal producing means for producing signals representative of a third condition; fourth condition responsive means including signal producing means for producing a signal representative of a fourth condition; first control means; first connecting means connecting to said first control means, said means for producing signals representative of said first condition, said means for producing a signal representative of said second condition, and said means for producing signals representative of said third condition; second control means; second connecting means connecting to said second control means, said means for producing signals representative of said third condition, said means for producing a signal representative of said fourth condition, and said first control means; and indicating means including a first and second element, said first element being adjusted by said first control means, said second element being adjusted by said second control means, and said second element being moved relative to said first element when said signal producing means included in said fourth condition responsive means produces a signal.

3. In apparatus for indicating a plurality of conditions: first condition responsive means; a first electrical network having first signal producing means connected to said first condition responsive means; second condition responsive means; a second electrical network having second signal producing means connected to said second condition responsive means; third condition responsive means; a third electrical network having third signal producing means connected to said third condition responsive means; fourth condition responsive means; a fourth electrical network having fourth signal producing means connected to said fourth condition responsive means; first control means; balance-signal producing means; first connecting means connecting to said first control means, said first signal producing means, said second signal producing means, said third signal producing means, and said balance-signal producing means; second control means; second connecting means connecting to said second control means, said third signal producing means, said fourth signal producing means, and said balance-signal producing means; and indicating means including a first and second movable element, said first element being adjusted by said first control means, said second element being adjusted by said second control means, and said second element being moved relative to said first element when said third signal producing means and said fourth signal producing means produce a signal.

4. In apparatus for indicating a plurality of conditions: a pressure-ratio computer including pressure-ratio signal producing means for producing signals representative of engine pressure-ratio; an engine inlet-air temperature sensor and actuator including signal producing means for producing a signal representative of engine inlet-air temperature; an engine tachometer including engine-speed signal producing means for producing signals representative of engine speed; an engine exhaust gas temperature sensor and actuator including signal producing means for producing a signal representative of engine exhaust-gas temperature; first control means; balance-signal producing means; first connecting means connecting to said first control means, said signal producing means of said pressure-ratio signal producing means, said inlet-air temperature signal producing means, said signal producing means of said engine-speed signal producing means, and said balance-signal producing means; second control means; second connecting means connecting to said second control means, said engine-speed signal producing means, said exhaust-gas temperature signal producing means, and said balance-signal producing means; means including connecting means for slaving said second control means to said first control means; indicating means including a first and second moveable indicator, said first moveable indicator indicating normal engine performance and being adjusted by said first control means, said second moveable indicator indicating engine damage condition and being adjusted by said second control means, said second moveable indicator being positioned with respect to said first moveable indicator when at least one of said engine-speed signal producing means and said exhaust-gas temperature signal producing means produce a signal.

5. In apparatus for indicating a plurality of conditions: first condition responsive means; first signal producing means; means operatively connecting said first signal producing means to said first condition responsive means; indicating means comprising first and second movable elements; first control means connected to said indicating means for controlling said first movable element; connecting means connecting said first control means to said first signal producing means; second condition responsive means adapted to respond to changes of a second condition outside a predetermined range as well as in a normal range; second signal producing means for producing a signal when said second condition is outside said predetermined range; means operatively connecting said second signal producing means to said second condition responsive means; third signal producing means; means operatively connecting said first movable element to said third signal producing means so that said third signal producing means produces a signal in accordance with the movement of said first movable element; second control means connected to said second movable element for controlling said movable element; and means including second connecting means connecting said second control means to said second and third signal producing means so that as long as said second condition is within said predetermined range said second movable element will respond to signals from said third signal producing means and when said second condition is outside of said predetermined range said second movable element will respond to signals from said second and third signal producing means.

6. An integrated engine performance indicator, comprising: a dial having a center axis; an index positioned adjacent said dial and adapted to move about said axis; first control means for adjusting the rotary position of said index with respect to said dial responsive to the desired performance of said engine; a first indicator member rotatably mounted in said axis adjacent said disc and index; second control means for adjusting the rotary position of said indicator member with respect to said index responsive to the actual performance of said engine, to thereby indicate a variation between actual and desired engine performance; a second indicator member rotatably mounted on said axis adjacent said first indicator member; third control means for normally adjusting the rotary position of said second indicator member with respect to said first indicator member responsive to said actual engine performance to thereby maintain said first and second indicator members in relatively fixed relation; and means for adjusting the authority of said third control means responsive to an abnormal engine condition to thereby cause relative movement between said first and second indicator means and thereby indicate said abnormal condition.

References Cited in the file of this patent

UNITED STATES PATENTS

| | | |
|---|---|---|
| 2,389,281 | Staley | Nov. 20, 1945 |
| 2,537,240 | Shaw | Jan. 9, 1951 |
| 2,706,407 | Hosford | Apr. 19, 1955 |
| 2,723,558 | Germer | Nov. 15, 1955 |